(12) United States Patent
Fogerty

(10) Patent No.: US 12,474,103 B2
(45) Date of Patent: Nov. 18, 2025

(54) CASE FOR SECURING AND COOLING A MOBILE DEVICE

(71) Applicant: Ann B. Fogerty, Mesa, AZ (US)

(72) Inventor: Ann B. Fogerty, Mesa, AZ (US)

(*) Notice: Subject to any disclaimer, the term of this patent is extended or adjusted under 35 U.S.C. 154(b) by 341 days.

(21) Appl. No.: 18/177,556

(22) Filed: Mar. 2, 2023

(65) Prior Publication Data

US 2024/0295357 A1  Sep. 5, 2024

(51) Int. Cl.
*F25D 3/00*  (2006.01)
*H04M 1/18*  (2006.01)

(52) U.S. Cl.
CPC ............ *F25D 3/00* (2013.01); *H04M 1/18* (2013.01)

(58) Field of Classification Search
CPC .......... H04M 1/18; H04M 1/185; F25D 3/00; G06F 1/20; A45C 11/002; A45C 11/00
See application file for complete search history.

(56) References Cited

U.S. PATENT DOCUMENTS

| | | |
|---|---|---|
| 7,280,355 B2 | 10/2007 | Taylor |
| 7,522,411 B2 | 4/2009 | Haglund |
| 9,128,684 B2 | 9/2015 | Chambers |
| 9,436,239 B1* | 9/2016 | Shannon, III ........... G06F 1/206 |
| 9,608,686 B1* | 3/2017 | Coulter .................. H04B 1/036 |
| 12,285,929 B2* | 4/2025 | Sehmbey ............ H04M 1/0279 |
| 2011/0005721 A1 | 1/2011 | Sum |
| 2013/0294020 A1* | 11/2013 | Rayner ................. G06F 1/1626 361/679.01 |
| 2014/0352926 A1* | 12/2014 | Sun ........................ G06F 1/203 165/104.26 |
| 2016/0042202 A1 | 2/2016 | Murray et al. |
| 2018/0143672 A1 | 5/2018 | Rivera, Jr. et al. |
| 2020/0288833 A1* | 9/2020 | Fathollahi ............. A45C 11/00 |
| 2020/0367383 A1* | 11/2020 | Moon ................ H05K 7/20336 |

FOREIGN PATENT DOCUMENTS

CN  103354571 A  * 10/2013
KR  20200016741 A  * 2/2020

* cited by examiner

*Primary Examiner* — Angelica Perez
(74) *Attorney, Agent, or Firm* — Parsons & Goltry, PLLC; Michael W. Goltry; Robert A. Parsons

(57) ABSTRACT

A case for a mobile device, including a perimetral sidewall extending between a back face and a screen, includes a body adapted to secure the mobile device and be hand-held by a user. The body has a sidewall extending outward from a back wall to a rim. The back wall and the sidewall define the body's an inner surface and outer surface. The inner surface forms a cavity configured to receive a mobile device through an opening encircled by the rim, the inner surface configured to contact the back face and surround and contact the perimetral sidewall, securing the mobile device when the cavity receives the mobile device through the opening. The body encloses a volume in the back wall, the volume filled with a refrigerant. The body additionally encloses a volume in the sidewall, the volume of the sidewall filled with a refrigerant.

4 Claims, 8 Drawing Sheets

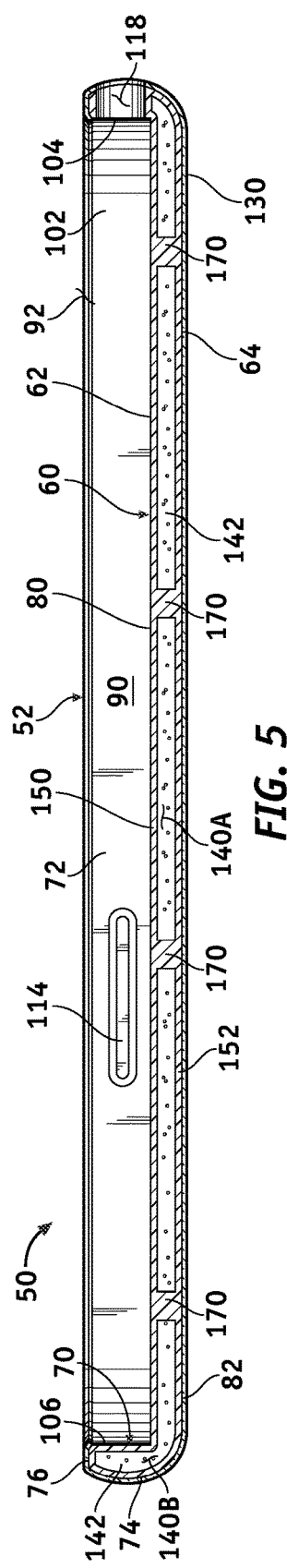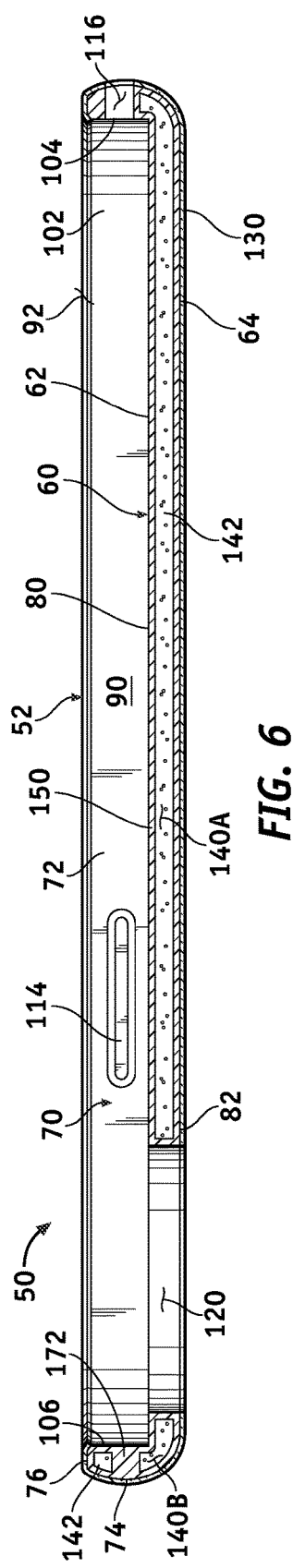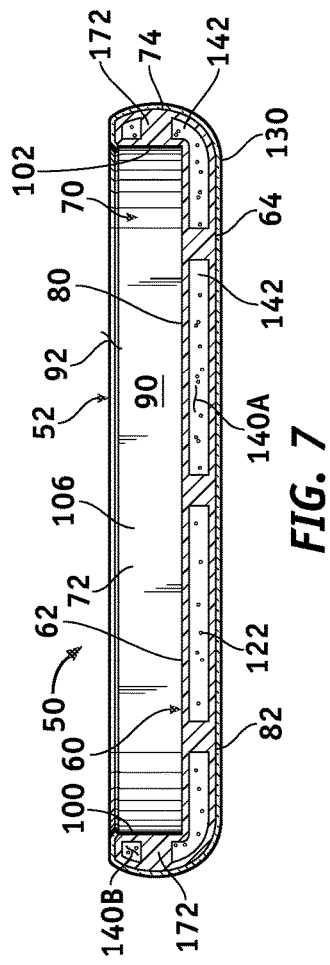

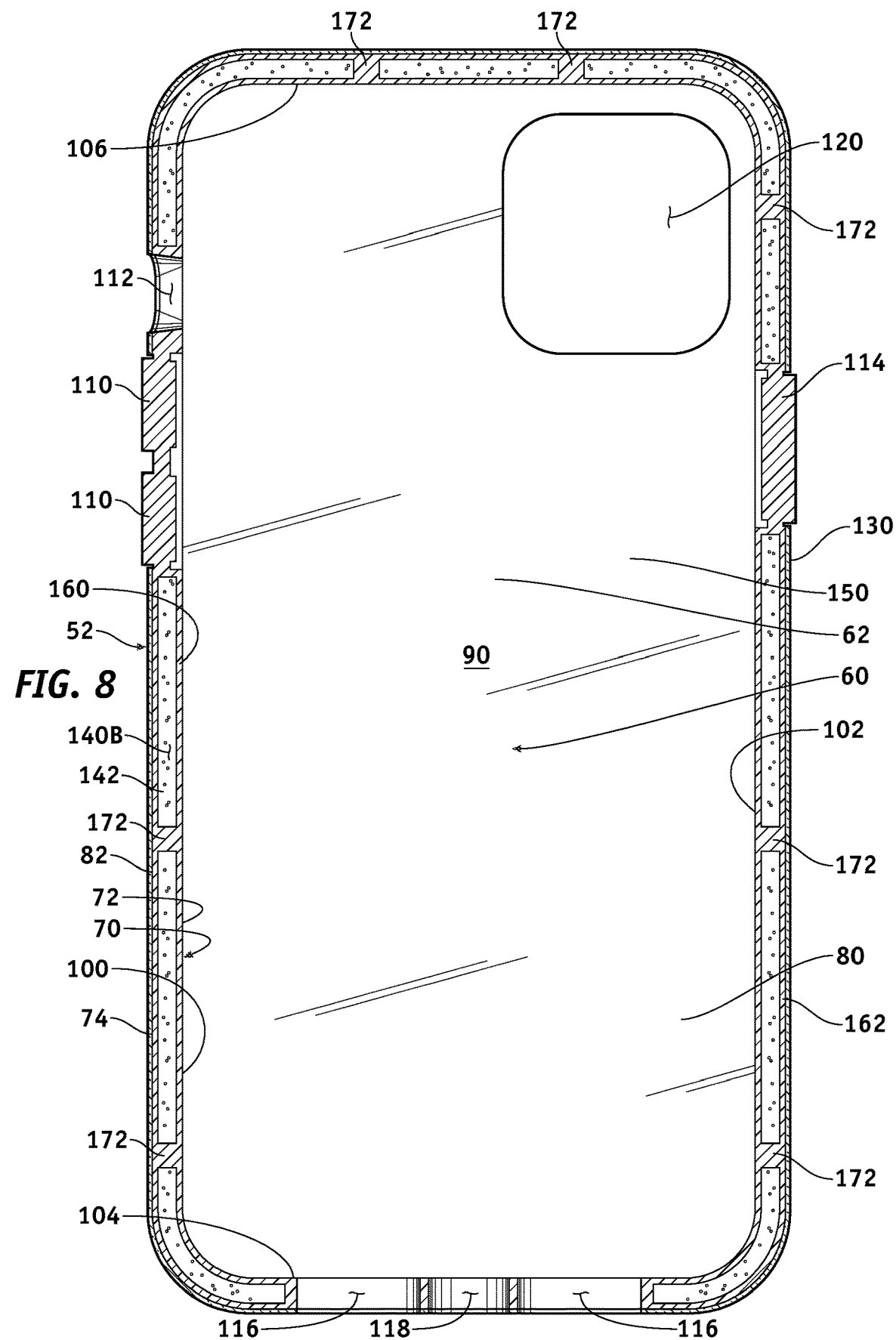

CASE FOR SECURING AND COOLING A MOBILE DEVICE

FIELD OF THE INVENTION

The present invention relates to user removable protective enclosures or cases for mobile devices and, more particularly, to a protective case configured to secure and cool a mobile device and be hand-held by a user.

DESCRIPTION OF RELATED ART

Electronic mobile devices, often referred to simply as mobile devices, are computing devices small enough to hold and operate by hand. Of significance are well-known battery-powered electronic mobile devices, such as smartphones or mobile phones and tablet computers, that can connect to the Internet and have flat screen interfaces with digital buttons and keyboards. Most such devices, powered by a lithium battery or battery pack, can connect to the Internet and interconnect with other devices. Integrated cameras, digital media players, the ability to place and receive telephone calls, and other capabilities are standard. Mobile devices may additionally run operating systems that allow third-party applications to be installed and run.

Mobile devices are inherently susceptible to overheating in high ambient temperatures, direct sunlight, and under an increased or prolonged workload. This often renders the mobile devices unworkable until cooled to a lower operating temperature. Skilled artisans have developed varieties of cooling devices designed to cool mobile devices. However, advances in the field have yet to be entirely satisfactory. They have yielded cooling devices that are expensive, difficult to construct, mechanically complex, large, unwieldy, impractical and unsuitable for being used with the mobile device while carrying the mobile device about and operating it by hand. Accordingly, there is a need for continued improvement in the art.

SUMMARY OF THE INVENTION

According to the invention, disclosed is a case for a mobile device, the mobile device including a screen, a back face, and a perimetral sidewall extending between the back face and the screen. The case includes a body adapted to secure the mobile device and be hand-held by a user. The body includes a back wall and a sidewall extending outward from the back wall to a rim. The back wall and the sidewall define an inner surface of the body and an outer surface of the body. The inner surface forms a cavity configured to receive a mobile device through an opening encircled by the rim. the inner surface is configured to contact the back face and surround and contact the perimetral sidewall, securing the mobile device when the cavity receives the mobile device through the opening. The body encloses a volume in the back wall. The volume is filled with a refrigerant. A thermally-resistant material is over the outer surface. The body is configured with buttons and openings configured to correspond with controls of the mobile device when the cavity receives the mobile device through the opening.

According to the invention, disclosed is a case for a mobile device, the mobile device including a screen, a back face, and a perimetral sidewall extending between the back face and the screen. The case includes a body adapted to secure the mobile device and be hand-held by a user. The body includes a back wall and a sidewall extending outward from the back wall to a rim. the back wall and the sidewall define an inner surface of the body and an outer surface of the body. The inner surface forms a cavity configured to receive a mobile device through an opening encircled by the rim. the inner surface is configured to contact the back face and surround and contact the perimetral sidewall, securing the mobile device when the cavity receives the mobile device through the opening. the body encloses a first volume in the back wall and a second volume in the sidewall. The first volume and the second volume are each filled with a refrigerant. The first volume and the refrigerant therein are open to the second volume and the refrigerant therein. A thermally-resistant material is over the outer surface. The body is configured with buttons and openings configured to correspond with controls of the mobile device when the cavity receives the mobile device through the opening.

According to the invention, disclosed is a case for a mobile device, the mobile device including a screen, a back face, and a perimetral sidewall extending between the back face and the screen. The case includes a body adapted to secure the mobile device and be hand-held by a user. The body includes a back wall and a sidewall extending outward from the back wall to a rim. The back wall and the sidewall define an inner surface of the body and an outer surface of the body. The inner surface forms a cavity configured to receive a mobile device through an opening encircled by the rim. The inner surface is configured to contact the back face and surround and contact the perimetral sidewall, securing the mobile device when the cavity receives the mobile device through the opening. The body enclosing a first volume in the back wall and a second volume in the sidewall. The first volume and the second volume are each filled with a refrigerant. The back wall includes an inner back wall section and an outer back wall section. The sidewall includes an inner sidewall section and an outer sidewall section. The inner sidewall section extends outward from the inner back wall section to the rim, the inner back wall section and the inner sidewall section defining the inner surface. The outer sidewall section extends outward from the outer back wall section to the rim, the outer back wall section and the outer sidewall section defining the outer surface. The first volume is in the back wall between the inner back wall section and the outer back wall section. The refrigerant in the back wall is in direct contact against the inner back wall section and the outer back wall section. The second volume is in the sidewall between the inner sidewall section and the outer side section. The refrigerant in the sidewall is in direct contact against the inner sidewall section and the outer sidewall section. First reinforcing spacers are in the first volume. The first reinforcing spacers are spaced-apart and coupled between the inner back wall section and the outer back wall section, reinforcing the backwall and maintaining the first volume between the inner back wall section and the outer back wall section. Second reinforcing spacers are in the second volume. The second reinforcing spacers are spaced-apart and coupled between the inner sidewall section and the outer sidewall section, reinforcing the sidewall and maintaining the second volume between the inner sidewall section and the outer sidewall section. The first volume and the refrigerant therein open to the second volume and the refrigerant therein. A thermally-resistant material is over the outer surface. The body is configured with buttons and openings configured to correspond with controls of the mobile device when the cavity receives the mobile device through the opening.

BRIEF DESCRIPTION OF THE DRAWINGS

Specific objects and advantages of the invention will be apparent to those skilled in the art from the following detailed description of illustrative embodiments thereof, taken in conjunction with the drawings in which:

FIG. 5 is a section view taken along line 5-5 of FIG. 4;
FIG. 6 is a section view taken along line 6-6 of FIG. 4;
FIG. 7 is a section view taken along line 7-7 of FIG. 4;
FIG. 8 is a section view taken along line 8-8 of FIG. 1.

DETAILED DESCRIPTION

Figure 1:
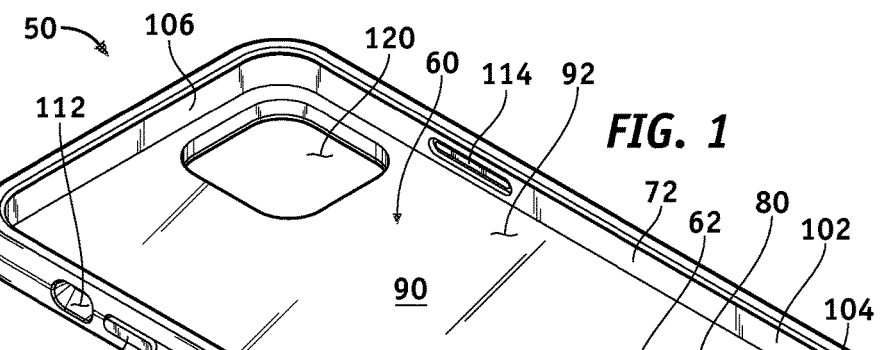
FIG. 1 is a top left perspective view of a case for a mobile device, the case constructed and arranged according to the principle of the invention and including a body insulated exteriorly by a thermally-resistant material, part of the thermally-resistant material broken away to show the body.
Figure 2:
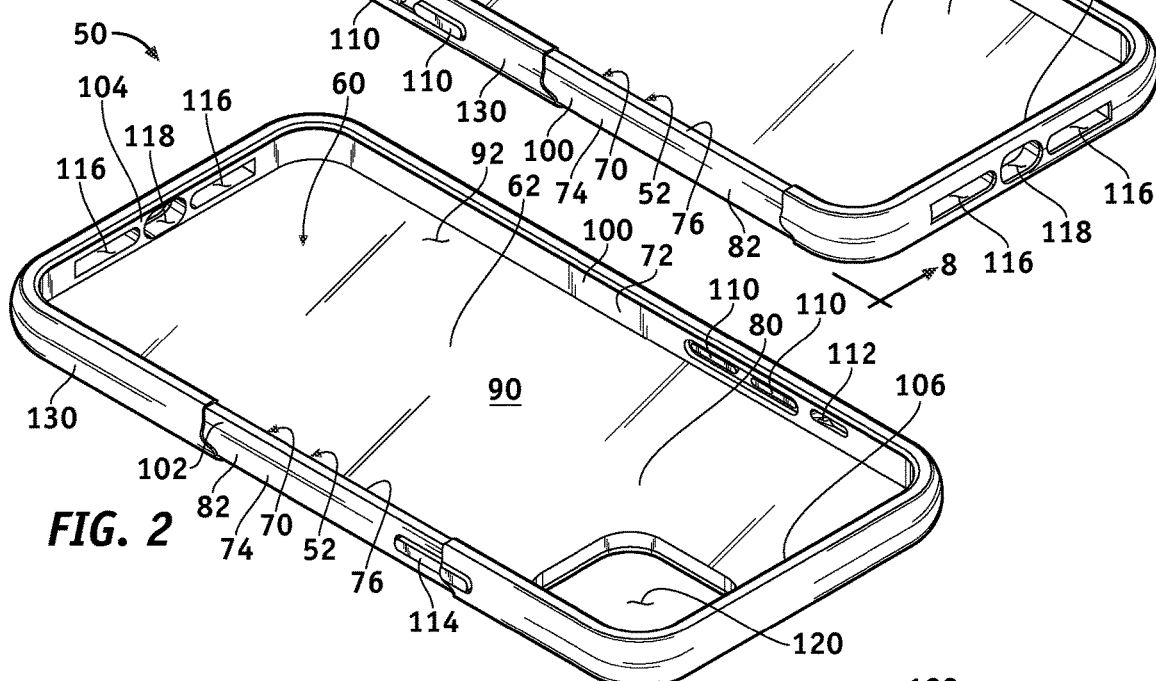
FIG. 2 is a top right perspective view of the embodiment of FIG. 1, part of the thermally-resistant material broken away to show the body.
Figure 3:
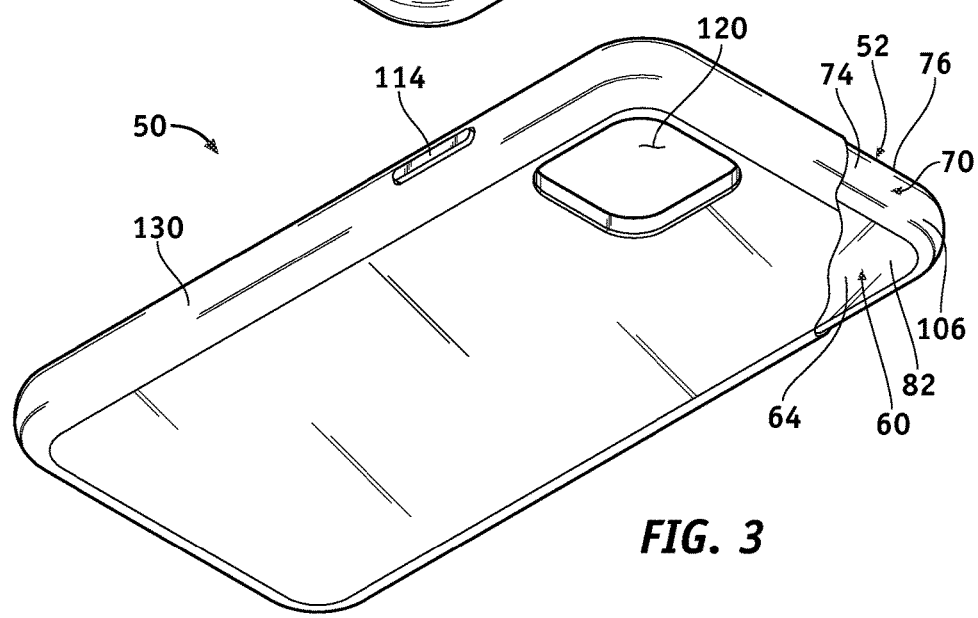
FIG. 3 is a bottom perspective view of the embodiment of FIG. 1, part of the thermally-resistant material broken away to show the body.
Figure 4:
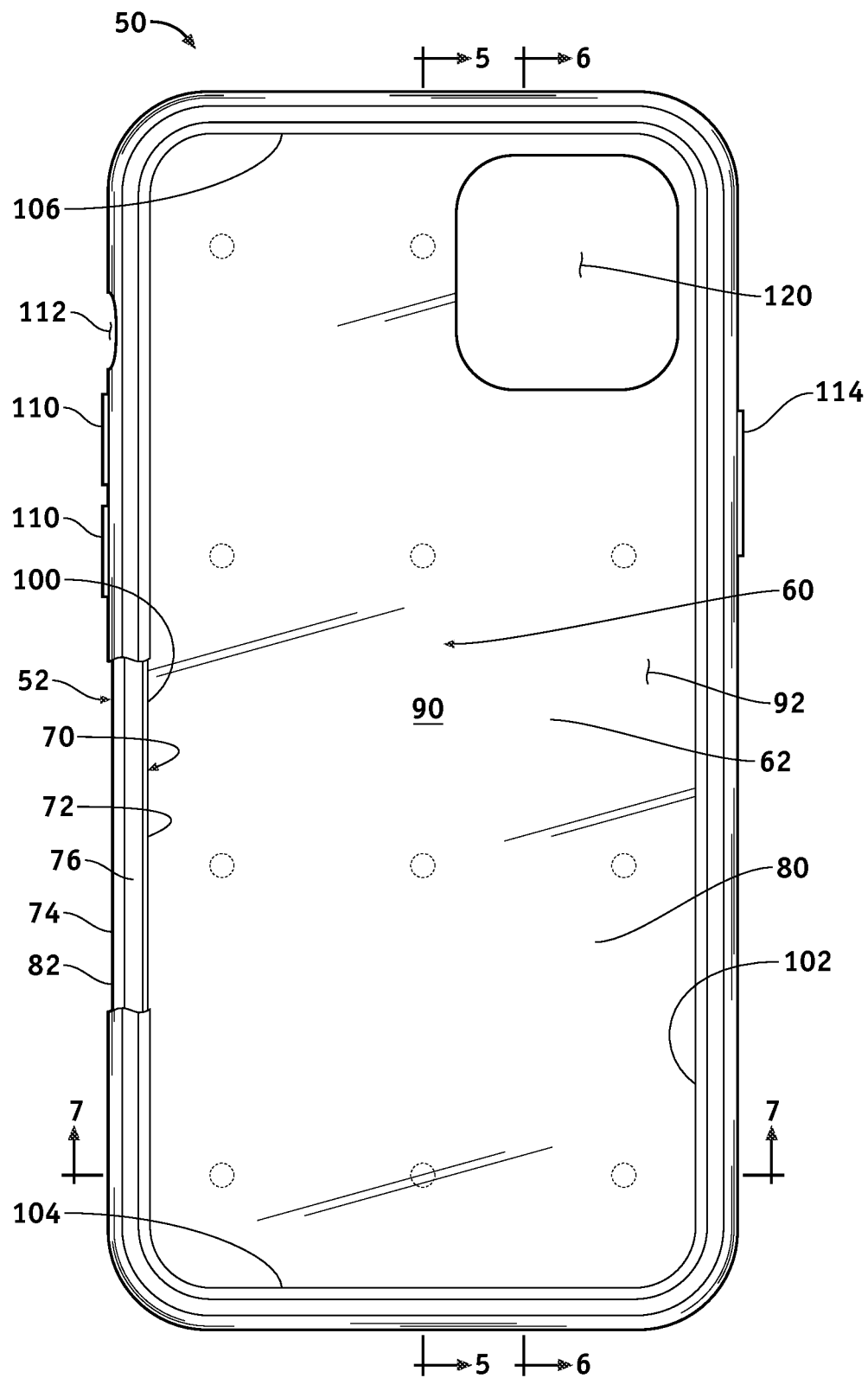
FIG. 4 is a top plan view of the embodiment of FIG. 1 including dotted line indications of reinforcing spacers of the body, part of the thermally-resistant material broken away to show the body.

Turning to the drawings, in which like reference characters indicate corresponding elements throughout the several views, disclosed is a case 50 configured to attach to, support, retain, and hold a mobile device and cool the mobile device. The case 50 is easy to use, portable, being easily movable and carried about by hand, including when it is installed onto a mobile device, simple in structure, unpowered, inexpensive, and has no moving or electrical parts. The case 50 is user installable onto the mobile device and user removable from the mobile device. The case 50 protects and cushions the mobile device from impact caused by being dropped or the like.

Referring in relevant part to FIGS. 1-8, the case 50 includes a body 52 adapted to secure the mobile device and be hand-held by a user. The body 52, formed of an inherently fluid impervious and thermally-conductive material or combination of materials, such as plastic, thermoplastic, nylon, natural and or synthetic rubber, a combination of two or more thereof or other chosen material or combination of materials having inherently strong, resilient, flexible, impact-resistant, fluid-impervious and thermally-conductive material characteristics, is unitary, a single or uniform entity.

The body 52 includes two main sections, a back wall 60 and a sidewall 70 affixed to the back wall 60. The back wall 60 is flat and includes an inner surface 62 and an outer surface 64. The sidewall 70 includes an inner surface 72, an outer surface 74 and a rim 76. The sidewall 70 and its rim 76 are continuous. The sidewall 70 extends outward from the back wall 60 to the rim 76. The inner surface 62 of the back wall 60 and the inner surface 72 of the sidewall 70 define the body's 52 inner surface, generally denoted at 80. The outer surface 64 of the back wall 60 and the outer surface 74 of the sidewall 70 define the body's 52 outer surface, generally denoted at 82. The inner surface 80 forms a mobile device cavity 90. The outer surface 82 forms the body's 52 exterior shape. The rim 76 encircles an opening 92 to the cavity 90 configured to receive a mobile device through the opening 92 directly over the bottom wall's 60 inner surface 62. The inner surface 80 is shaped and configured to directly contact the back face and the perimetral sidewall of the mobile device when the cavity 90 receives the mobile device through the case's 50 opening 92, fitting the case's body 52 to the mobile device huggingly. Specifically, the back wall's 60 inner surface 62 is configured to directly contact the back face of the mobile device and the sidewall's 70 inner surface 72 is configured to surround and directly contact the mobile device's perimetral sidewall when the cavity 90 receives the mobile device through the opening 92. Accordingly, the case's 50 body 52 attaches to, supports, retains, holds and hugs or otherwise embraces the mobile device for which the case 50 is configured when the cavity 90 receives the mobile device through the opening 92.

The sidewall 70 includes opposite sides 100 and 102 that extend between opposite ends 104 and 106. The sides 100 and 102, the respective left and right sides of the body 52, are equal in length and longer than equal length than the ends 104 and 106, the respective bottom and top ends of the body 52. The case's 50 body 52 is shallow and rectangular in this example, according to the shape of the mobile device for which the case 50 is configured. Specifically, the sides 100 and 102 are perpendicular relative to the ends 104 and 106, the length of the case 50 from end 104 to end 106 is greater than the width of the case 50 from side 100 to side 102, and the rim 76, the bottom wall 60, and the cavity 90 are each rectangular. Although the shape of the case 50 determined by its body 52 is thin and rectangular, the person of ordinary skill will appreciate that the case's 50 body 52 can have other shapes to correspond with the shape of the specific mobile device for which the case 50 is configured.

The body 52 has standard control buttons and openings configured to relate functionally to the corresponding controls of the mobile device for which the case 50 is configured. In this example, side 100, the case's 50 left side, includes buttons 110 positioned, dimensioned, configured, and adapted to interface with and actuate the corresponding volume control buttons of the mobile device. Extending through side 100 is an opening 112 positioned and dimensioned to correspond with the mobile device's ringer silent switch to provide functional user access to the switch. Side 102, the case's 50 right side, includes a button 114 positioned, dimensioned, configured, and adapted to interface with the mobile device's power switch. Extending through end 104, the case's 50 bottom end, are openings 116 and opening 118 centered between the openings 116. The openings 116 on either side of opening 118 are positioned and dimensioned to correspond with the mobile device's speakers. The opening 118 is positioned and dimensioned to correspond with the mobile device's port, the headphone jack and charging port. End 106, the case's 50 top end, does not include buttons or openings in this example. Extending through the body's 52 back wall 60 is an opening 120 positioned and dimensioned to correspond with the mobile device's camera to enable a user to acquire photographic and video content via the camera without interference from the case 50. The body 52 can be configured with any arrangement of buttons and openings adapted to relate functionally to the corresponding controls of the mobile device for which the case 50 is configured.

In this example, the body 52 is thermally insulated exteriorly by a thermally-resistant material 130 applied over the body's 52 outer surface 82 and rim 76. The material 130, a material or combination of materials configured to provide resistance to heat flow, consists of one or more layers of compressed cotton, wool, foam material, such as high-density polystyrene, or other suitable material or combination of thermally-resistant materials, is adhered to the case's 50 outer surface 82 adhesively. In alternate embodiments, the material 130 can be in the form of a separate case fitted removably over the outer surface 82 and the rim 76. The material 130 is formed around and does not interfere with the case's 50 buttons and openings described above.

In FIGS. 5-8, the case's 50 body 52 is a housing that defines and encloses a volume 140 filled with a refrigerant 142, according to the invention. The refrigerant is preferably a conventional freezable gel or gel-like substance. Any suitable freezable liquid, including water, may be utilized or any of several conventional freezable gel-like substances. The volume 140 includes a first volume 140A and a second volume 140B. The first volume 140A is in and throughout the back wall 60. The second volume 140B is in and throughout the sidewall 70, except at the sidewall's 70 buttons and openings in FIG. 8 that do not form parts of the second volume 140B. The first volume 140A and the second volume 140B are each filled with the refrigerant 142. The volume 140 is unitary in this example, being undivided, the first volume 140A and the refrigerant 142 it contains being open to the second volume 140B and the refrigerant 142 it contains. The volume 140 is fluid impervious, which disables the refrigerant 142 from leaking outwardly from the volume 140 through the body 52, which is fluid impervious. The case's 50 body 52 closes the volume 140 and its contents from the case's 50 buttons and openings in FIG. 8. The inherent thermally-conductive material characteristic of the case's 50 body 52 enables the body 52 to conduct the temperature of the refrigerant 142 to the case's 50 cavity 90 and its contents. The material 130 on the case's 50 outer surface 82 resists receiving and conducting the refrigerant's 142 temperature to a user's hand grasping the material 130 when holding the case 50 by hand. The body 52 may be without the material 130 if so desired.

Referring in relevant part to FIGS. 5-8, the back wall 60, a flat hollow structure, includes an inner back wall section 150 and an outer back wall section 152. The sidewall 70, a continuous partially hollow structure, being hollow except at its buttons and opening, includes an inner sidewall section 160 and an outer sidewall section 162 that form the opposite sides 100 and 102 and the opposite ends 104 and 106 described previously. The inner and outer back wall sections 150 and 152 are parallel and axially spaced apart. The inner and outer sidewall sections 160 162 are also spaced-apart axially. The inner sidewall section 160 extends outward from the inner back wall section 150 to the rim 76. The inner back wall section 150 and the inner sidewall section 160 define the inner surface 80. The outer sidewall section 162 extends outward from the outer back wall section 152 to the rim 76. The outer back wall section 152 and the outer sidewall section 162 define the outer surface 82.

The refrigerant 142 in the first volume 140A between the inner back wall section 150 and the outer back wall section 152 is in direct contact against the inner back wall section 150 and the outer back wall section 152. The refrigerant 142 in the second volume 140B is in direct contact against the inner sidewall section 160 and the outer sidewall section 162. Although the sidewall's 70 buttons and openings divide the second volume 140B into separate sections along the sidewall 70, these separate sections are the second volume 140B that extends upright from the first volume 140A to the enclosing rim 76. The inherent thermally-conductive material characteristic of the case's 50 body 52 enables the inner back wall section 150 and the inner sidewall section 170 to conduct the temperature of the enclosed refrigerant 142 to the cavity 90 and its contents. The material 130 on the outer surface 82 of the outer bottom wall section 152 and the outer sidewall section 172 resists receiving and conducting the refrigerant's 142 temperature.

The case's 50 body 52 has reinforcing spacers, including first reinforcing spacers 170 in the first volume 140A and second reinforcing spacers 172 in the second volume 140B. The first reinforcing spacers 170, pins or pegs, are spaced-apart, dispersed throughout the first volume 140A, and coupled between the inner back wall section 150 and the outer back wall section 152. The first reinforcing spacers 170 reinforce the backwall 60 and maintain the first volume 140A between the inner back wall section 150 and the outer back wall section 152. In this example, there are eleven reinforcing spacers 170, each denoted by dotted line in FIG. 4, and less or more can be used. The second reinforcing spacers 172, pegs or pins, are spaced-apart, dispersed throughout the second volume 140B, and coupled between the inner sidewall section 160 and the outer sidewall section 162. The second reinforcing spacers 172 reinforce the sidewall 70 and maintain the second volume 140B between the inner sidewall section 160 and the outer sidewall section 162. In this example, there are seven reinforcing spacers 172 shown in FIG. 8, and less or more can be used.

Figure 9:
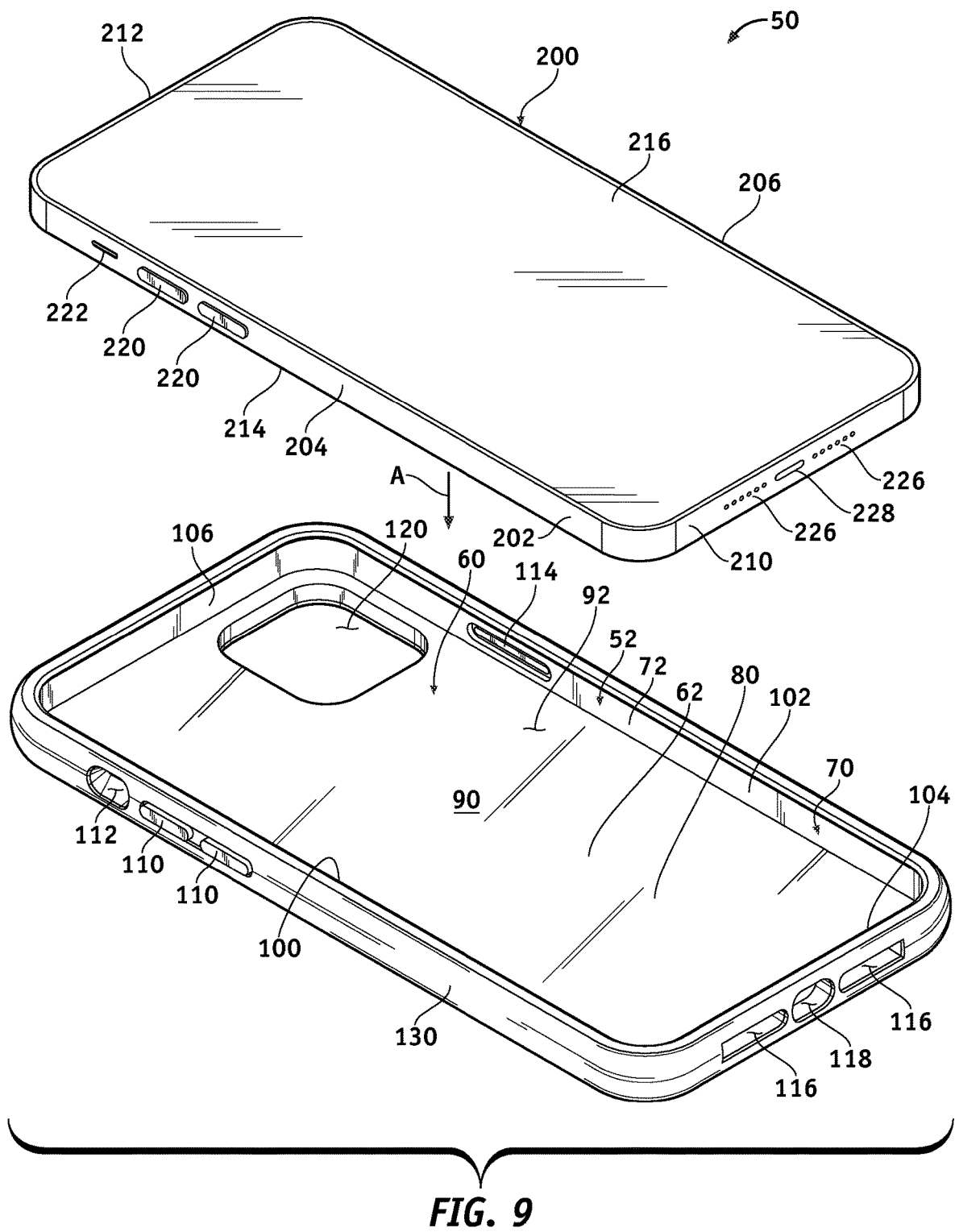
FIG. 9 is a top left perspective view of the case first illustrated in FIG. 1 and a mobile device, the case and the mobile device disassembled.
Figure 10:
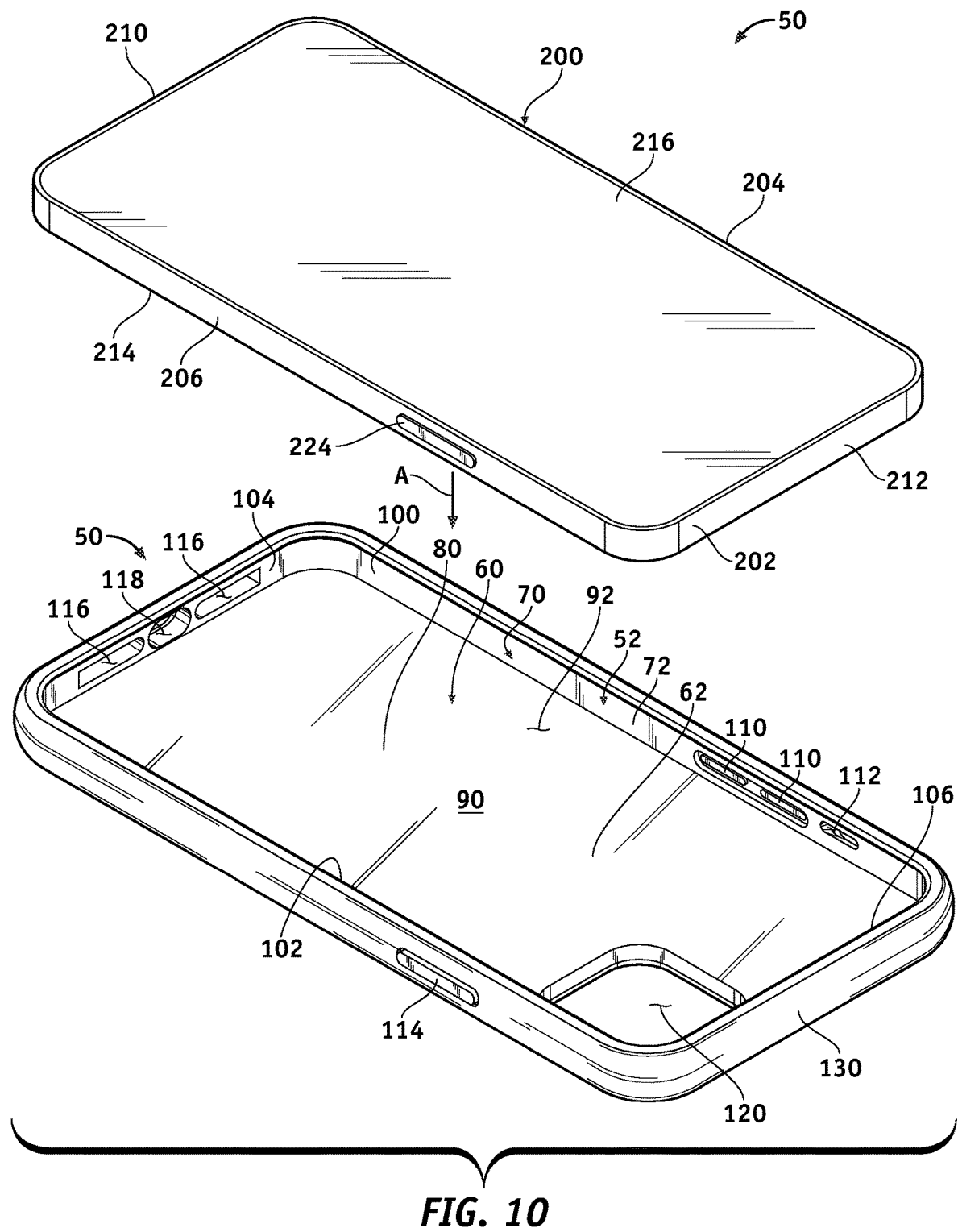
FIG. 10 is a top right perspective view of the embodiment of FIG. 9.
Figure 11:
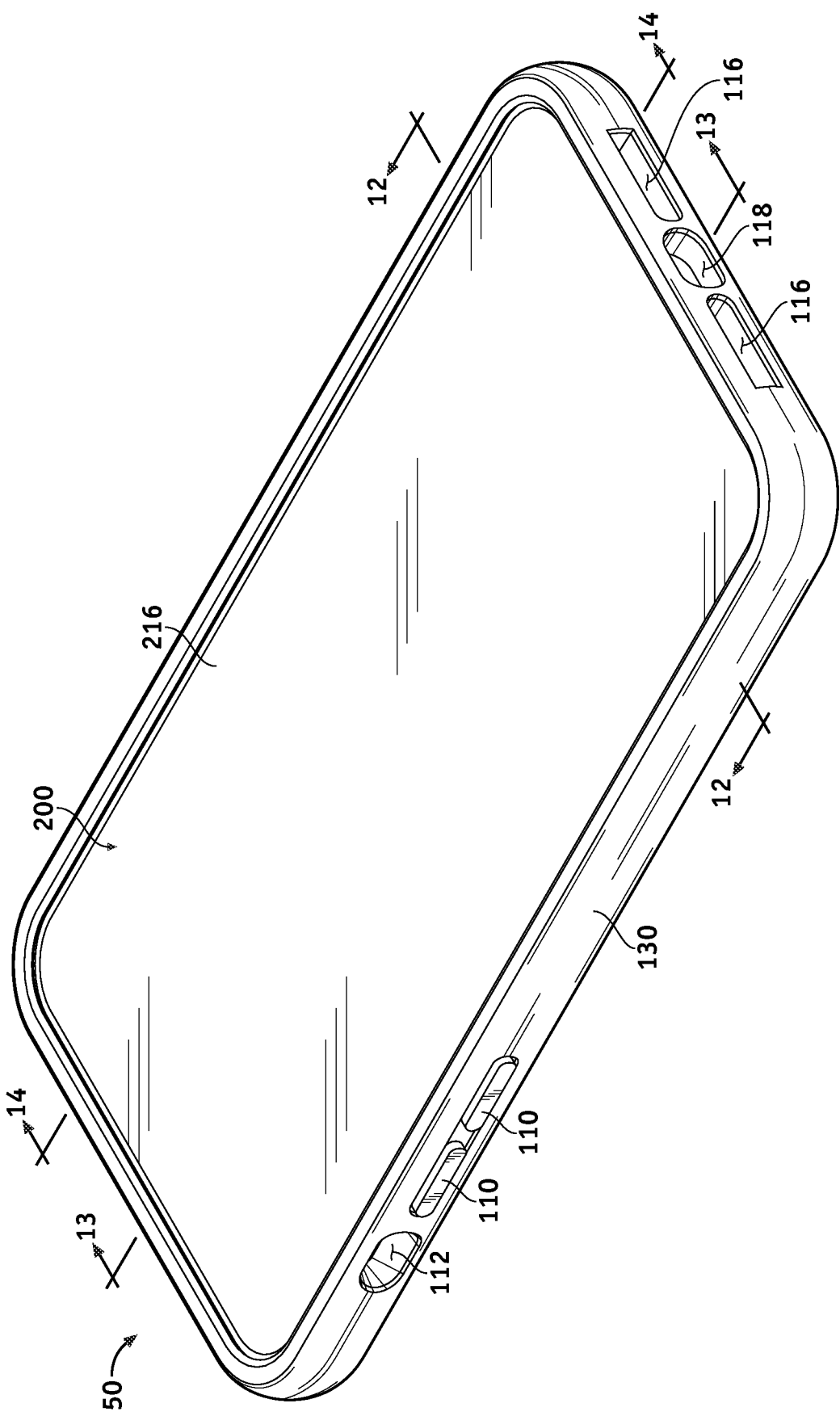
FIG. 11 is a view corresponding to FIG. 9, illustrating the case and the mobile device assembled.

The case's 50 body 52 attaches to, supports, retains, and holds a mobile device huggingly or embracingly and the refrigerant 142 when chilled or frozen cools the mobile device, such as mobile device 200 in FIGS. 9 and 10 when the cavity 90 receives the mobile device 200 through the opening 92 and the refrigerant is chilled or frozen. In this example, the mobile device 200 is generally representative of a standard mobile phone or smartphone. The mobile device 200 is battery-powered and inherently susceptible to overheating. It is flat, thin and rectangular-shaped, determined by it rectangular, continuous perimetral sidewall 202, composed of opposed, parallel left and right sides 204 and 206 and opposed parallel bottom and top ends 210 and 212, extending between the mobile device's 200 flat back face 214 and its opposed, parallel screen 216. In this example, side 204 includes volume control buttons 220 and a ringer silent switch 222. Right side 204 includes a power switch 114. End 210 includes speakers 226 on either side of a headphone jack and charging port 228. The back face 214 includes a camera 230 in FIG. 13.

Concerning the case's 50 use, the refrigerant 142 is chilled or frozen, such as by placing the case 50 in a refrigerator or freezer until the refrigerant 142 is chilled or frozen. Since the refrigerant 142 directly contacts the inner back wall section 150 and the inner sidewall section 170, the inherent thermally-conductive material characteristic of the inner back wall section 150 and the inner sidewall section 170 enable them to efficiently and readily conduct the refrigerant's 142 cooling temperature to the cavity 90 and its contents, maintaining the cavity 90 and its contents at a cool or low-temperature condition for a prolonged duration.

After removing the case 50 from the refrigerator or freezer, a user installs the case 50 onto the mobile device 200 by hand as he would with a standard case. In FIGS. 9 and 10, he registers the mobile device 200 with the case's 50 cavity 90, facing the mobile device's 200 back face 214 over the case's 50 opening 92 and registering the mobile device's 200 sides 204 and ends 210 and 212 with the case's sides 100 and 102 and ends 104 and 106, respectively. He moves the mobile device 200 in the direction of arrow A into the cavity 90 through the case's 50 opening 92. He forces the mobile device 200 firmly into the cavity 90, assembling the mobile device 200 and the case 50 in FIGS. 11-14. The case 50 protects and cushions the mobile device 200 from impact caused by being dropped or the like. The refrigerant 142 within the case 50 serves as the case's 50 internal padding or cushion that, in addition to the case's 50 body 52, absorbs forces exerted against the case 50 from impact caused by being dropped or the like. A user may separate the case 50 from the mobile phone 200 by hand by reversing this operation, by simply forcibly pulling case 50 and the mobile device 200 apart by hand. A user may repeatedly assemble and disassemble the case 50 and the mobile device 200 by hand as desired. The inherent material characteristics of the case 50 enable it to yield resiliently when the user installs the mobile device 200 into the cavity 90 and withdraws the mobile device 200 from the cavity 90.

Figure 12:
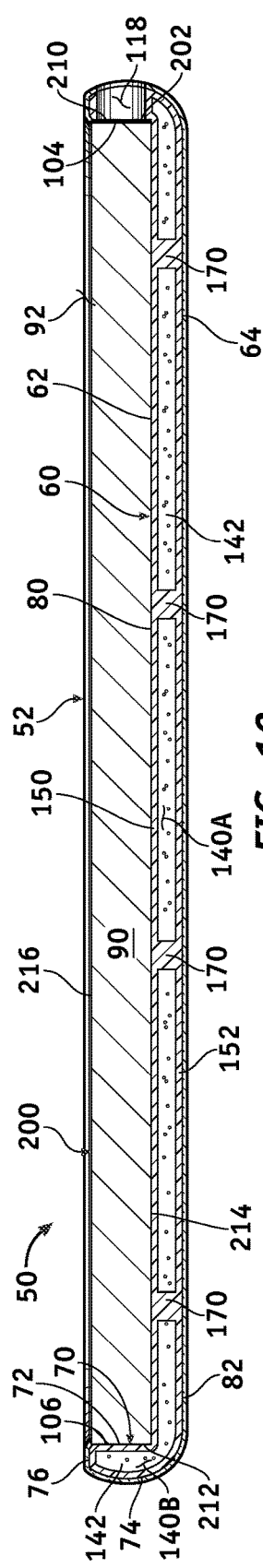
FIG. 12 is a section view taken along line 12-12 of FIG. 11.
Figure 13:
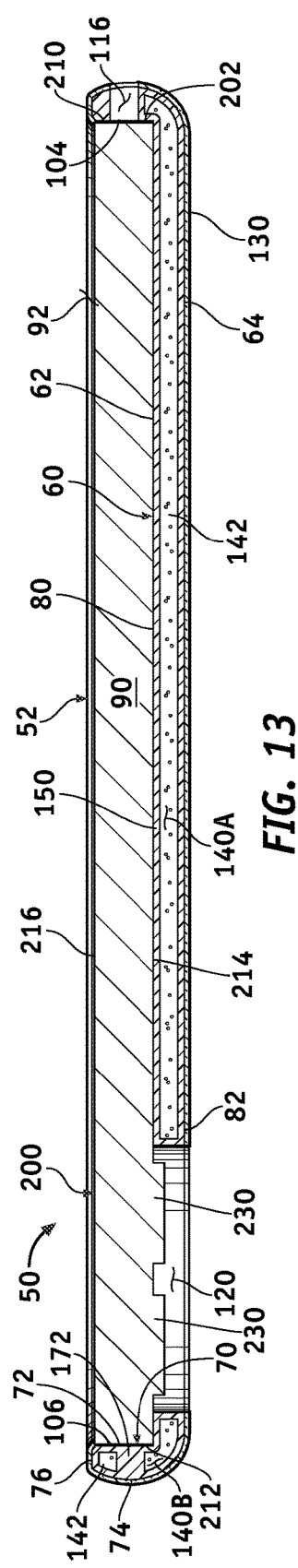
FIG. 13 is a section view taken along line 13-13 of FIG. 11.
Figure 14:
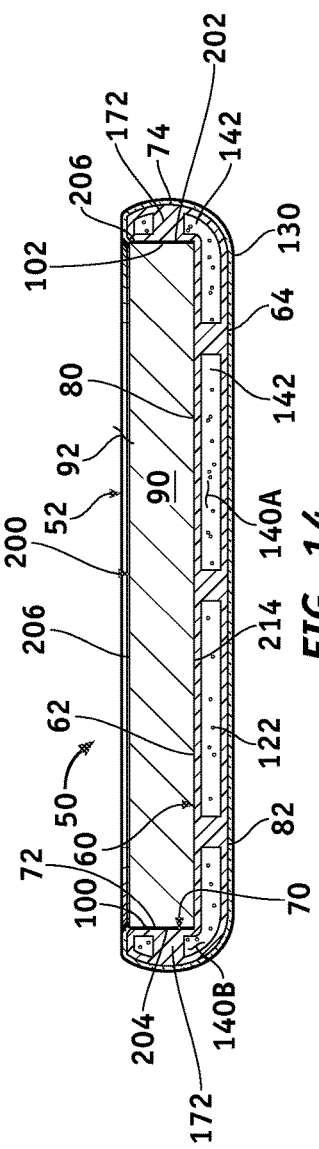
FIG. 14 is a section view taken along line 14-14 of FIG. 11.

Once assembled in FIGS. 12-14, the case's 50 inner surface directly contacts the mobile device's 50 back face 214 and surrounds and directly contacts the perimetral sidewall 202, securing the case's 50 body 52 to the mobile device 200 huggingly or embracingly and relating the body's 52 buttons and openings with the corresponding controls of the mobile device 200 functionally at the same time. Specifically, the back wall's 60 inner surface 62 directly contacts the back face 214 and the sidewall's 70 inner surface 72 surrounds and directly contacts the mobile device's 200 perimetral sidewall 202. Referring in relevant part to FIGS. 12-14, the inner surface 72 of the body's 52 left side 100 contacts the mobile device's 200 left side 204. The inner surface 72 of the body's 52 right side 102 contacts the mobile device's 200 right side 206. The inner surface 72 of the body's 52 bottom end 104 contacts the mobile device's 200 bottom end 210. The inner surface 72 of the body's 52 top end 106 contacts the mobile device's 200 top end 212. The body's rim 76, which is slightly in-turned over the bottom wall's 600 inner surface 62, hooks slightly over the mobile phone's 200 screen 216 from the mobile device's 200 perimetral sidewall 202. The body's 52 buttons 110 interface with the mobile phone's 200 volume control buttons 220, enabling a user to activate the volume control buttons 220 via the buttons 110. The body's 52 opening 112 corresponds with the mobile phone's 200 ringer silent switch 222, providing functional user access to the ringer silent switch 222. The body's 52 button 114 interfaces with the mobile device's 200 power switch 224, enabling a user to turn activate and deactivate the mobile device 200 via the button 114. The body's openings 116 correspond with the mobile device's speakers 226, enabling sound issued from the speakers to transit through the respective openings 116 without interference from the case 50. The body's 52 opening 118 corresponds with the mobile phone's 200 port 228, enabling a user to repeatedly plug and unplug jacks into and from the port via the opening 118. The body's 52 opening 120 accepts the mobile phone's 200 camera 230, enabling a user to acquire photographic and video content via the camera 230 without interference from the case 50. Again, the case 50 can be configured with various configurations of buttons and openings positioned, dimensioned, configured, and adapted to conventionally relate functionally to the corresponding controls of the mobile device for which the case 50 is configured.

The temperature of the chilled or frozen refrigerant 142 in the body's 52 volume 140 conducts through the inner back wall section 150 and the inner sidewall section 170 to the cavity 90 and its contents, the mobile phone 200. This expedient inherently chills the cavity 90 and the mobile phone 200, keeping the cavity 90 at a cool or low-temperature condition for a prolonged duration, cooling mobile device 200 in the cavity 90, preventing it from overheating, thereby enabling it to work efficiently for its intended purposes. The expedient of the case's 50 inner surface 80 in direct contact against the mobile device's 50 back face 214 and the perimetral sidewall 202 serves to directly expose the mobile phone's 200 back face 214 and the perimetral sidewall 202 to the cooling influence of the volume's 140 refrigerant 142, inherently and efficiently cooling the mobile device 200 in the case's 50 cavity 90. The case 50 is comfortable when hand-held since the material 130 on the case's 50 outer surface 82 resists receiving and conducting the refrigerant's 142 temperature to the user's hand grasping the material 130 when hand-holding the case 50. A user may disassemble the case 50 and the mobile device 200, chill or freeze the refrigerant 142 and reassemble the case 50 and the mobile device 200 as desired.

This specification discloses a user removable protective case 50 configured to secure and cool a mobile device, such as mobile device 200, and be hand-held by a user. A case constructed and arranged according to the invention can be configured for any format of mobile device format, whether a mobile phone or smartphone, a tablet computer, or the like.

The present invention is described above with reference to illustrative embodiments. Those skilled in the art will recognize that changes and modifications may be made in the described embodiments without departing from the invention. Various changes and modifications to the embodiments herein chosen for purposes of illustration will readily occur to those skilled in the art. To the extent that such modifications and variations do not depart from the invention, they are intended to be included within the scope thereof.

The invention claimed is:

1. A removably protective case for a mobile device, the mobile device including a screen, a back face, and a perimetral sidewall extending between the back face and the screen, the case comprising:
   a body adapted to secure the mobile device and be hand-held by a user, the body comprising a back wall and a sidewall extending outward from the back wall to a rim, the back wall and the sidewall defining an inner surface of the body and an outer surface of the body, the inner surface forming a cavity configured to receive a mobile device through an opening encircled by the rim, the inner surface configured to contact the back face and surround and contact the perimetral sidewall, securing the mobile device when the cavity receives the mobile device through the opening;
   the body enclosing a first volume in the back wall and a second volume in the sidewall;
   the first volume and the second volume each filled with a refrigerant;
   the back wall comprising an inner back wall section and an outer back wall section;
   the sidewall comprising an inner sidewall section and an outer sidewall section;

the inner sidewall section extending outward from the inner back wall section to the rim, the inner back wall section and the inner sidewall section defining the inner surface;

the outer sidewall section extending outward from the outer back wall section to the rim, the outer back wall section and the outer sidewall section defining the outer surface;

the first volume in the back wall between the inner back wall section and the outer back wall section, the refrigerant in the back wall in direct contact against the inner back wall section and the outer back wall section;

the second volume in the sidewall between the inner sidewall section and the outer side section, the refrigerant in the sidewall in direct contact against the inner sidewall section and the outer sidewall section;

first reinforcing spacers in the first volume, the first reinforcing spacers spaced-apart and coupled between the inner back wall section and the outer back wall section, reinforcing the backwall and maintaining the first volume between the inner back wall section and the outer back wall section; and second reinforcing spacers in the second volume, the second reinforcing spacers spaced-apart and coupled between the inner sidewall section and the outer sidewall section, reinforcing the sidewall and maintaining the second volume between the inner sidewall section and the outer sidewall section.

2. The case according to claim 1, further comprising the first volume and the refrigerant therein open to the second volume and the refrigerant therein.

3. The case according to claim 1, further comprising a thermally-resistant material over the outer surface.

4. The case according to claim 1, further comprising the body configured with buttons and openings configured to correspond with controls of the mobile device when the cavity receives the mobile device through the opening.

* * * * *